(12) United States Patent
Park et al.

(10) Patent No.: US 6,656,075 B2
(45) Date of Patent: Dec. 2, 2003

(54) HYDRAULIC CONTROL SYSTEM FOR AUTOMATIC TRANSMISSION

(75) Inventors: Jong-Sool Park, Suwon (KR); Chang-Wook Lee, Yongin (KR); Joon-Bae Kim, Seongnam (KR); Jae-Duk Jang, Yongin (KR); Tae-Kyun Kim, Yongin (KR); Jin-Hee Lee, Yongin (KR)

(73) Assignee: Hyundai Notor Company, Seoul (KR)

( * ) Notice: Subject to any disclaimer, the term of this patent is extended or adjusted under 35 U.S.C. 154(b) by 26 days.

(21) Appl. No.: 10/028,114

(22) Filed: Dec. 20, 2001

(65) Prior Publication Data

US 2002/0086762 A1 Jul. 4, 2002

(30) Foreign Application Priority Data

Dec. 30, 2000 (KR) .......................... 2000-87012

(51) Int. Cl.$^7$ .......................... F16H 61/06; F16H 61/08
(52) U.S. Cl. ........................ 475/128; 475/144
(58) Field of Search ............. 475/116, 127, 475/128, 131, 144

(56) References Cited

U.S. PATENT DOCUMENTS 6,027,427 A 2/2000 Yoo
2001/0043728 A1 * 11/2001 Kim et al. .................. 475/119

FOREIGN PATENT DOCUMENTS

JP 07301318 A * 11/1995

* cited by examiner

Primary Examiner—Ankur Parekh
(74) Attorney, Agent, or Firm—Pennie & Edmonds LLP

(57) ABSTRACT

Disclosed is a hydraulic control system for an automatic transmission that controls a powertrain, which includes a first friction element for use as an engine brake for discontinuing operation of a one-way clutch in the transmission and a second friction element operating only when the first friction element is disengaged. The hydraulic control system comprises a manual valve including a forward range port for exhausting hydraulic pressure when driving in a forward range, and an L range port for exhausting hydraulic pressure for low speed control; and a switch valve controlled by engine brake signal pressure, solenoid pressure, and forward range pressure supplied from the forward range port, the switch valve selectively supplying control pressure to the first friction element and the second friction element.

8 Claims, 3 Drawing Sheets

US 6,656,075 B2

HYDRAULIC CONTROL SYSTEM FOR AUTOMATIC TRANSMISSION

BACKGROUND OF THE INVENTION

The present invention relates to a hydraulic control system for an automatic transmission, and more particularly, to a hydraulic control system for an automatic transmission in which the supply of hydraulic pressure to two friction elements operating in different shift ranges is controlled by a single switch valve such that damage to the powertrain, which may result if two friction elements operate simultaneously, is prevented.

Conventional automatic transmissions used in vehicles typically include a torque converter, a powertrain realized through a multi-stage gearshift mechanism that is connected to the torque converter, and a hydraulic control system that selectively operates one of a plurality of operational elements of the powertrain according to a driving state of the vehicle.

In such an automatic transmission, although all the advantages of an automatic transmission over a manual transmission are provided (e.g., ease of driving), the generation of significant shift shock nevertheless remains a problem. To minimize shift shock, it is necessary to smoothly control clutches and brakes of the powertrain. In this regard, more effective than the most precise electronic control is the mounting of a one-way clutch. In the case where shifting is performed during an already ongoing shift process, good responsiveness can be expected with the use of a one-way clutch.

FIG. 4 shows a schematic view of a hydraulic control system for controlling a four-speed automatic transmission powertrain, which is capable of utilizing the advantages of one-way clutches during shifting between ranges 1 and 2, between ranges 3 and 4, and between range 4 and 2. With reference to the drawing, lines are formed to enable the supply of a D range pressure provided from a manual valve 200 to a first clutch C1 and to first, second, and third pressure control valves 202, 204, and 206; the supply of L range pressure provided from the manual valve 200 to the first pressure control valve 202; and the direct supply of R range pressure provided from the manual valve 200 to a third clutch C3 and to a first brake B1.

The D range pressure supplied to the first pressure control valve 202 is selectively supplied, according to control by a first solenoid valve 208, to an operational side of a second brake B2, and the L range pressure is supplied to the first brake B1 in a low L range. The first brake B1 is connected to the first pressure control valve 202 and an R range port of the manual valve 200 via a shuttle valve 210 such that hydraulic pressure is supplied to the first brake B1 no matter which direction hydraulic pressure is supplied from.

The D range pressure supplied to the second pressure control valve 204 is supplied to a second clutch C2 and the third pressure control valve 206 according to control by a second solenoid valve 212.

Also, the D range pressure supplied to the third pressure control valve 206 is selectively supplied to a fourth clutch C4 according to control by a third solenoid valve 214. In such an instance where the D range pressure is supplied to the fourth clutch C4, the third pressure control valve 206 supplies hydraulic pressure from the second pressure control valve 204 to a non-operational side of the second brake B2.

Hence, the first clutch C1 operates in first, second, and third speeds; the second clutch C2 operates in third and fourth speeds; the third clutch C3 operates in a reverse R range; the fourth clutch C4 operates in a park P range, the reverse R range, a neutral N range, and the low L range, and in the first, second, and third speeds according to driving conditions; the first brake B1 operates in the park P, reverse R, neutral N, and low L ranges; and the second brake B2 operates in the second and fourth speeds.

However, in the conventional hydraulic control system as described above, since the system simply acts to control line pressure and the solenoid valves merely operate as switch valves to control timing, precise shift control is not possible.

In particular, since control of non-operational sides of the second clutch C2 and the second brake B2 is linked, precise control is not possible shifting between ranges 2 and 3. Also, with the operation of the first brake B1 and the fourth clutch C4, which enable operation of the engine brake, since a method is used in which line pressure is directly supplied, significant shift shock may be generated.

Further, during manual shifting from the low 2 range to the low L range, the supply line pressure to the first brake B1 occurs simultaneously with the exhaust of operational-side pressure from the second brake B2, which also results in the generation of a shift shock. Also, manual shifting into the reverse R range from the drive D range when traveling at a high speed results in shifting being forcedly performed by line pressure, thereby causing shift shock as well as possible damage to friction material.

In addition, if manual control into the low L range is performed when driving in the third speed or higher, the second clutch C2 is disengaged such that engine fuel cut-off is performed at high speeds. As a result, an abrupt control into neutral occurs so that normal operation of the vehicle is not possible.

SUMMARY OF THE INVENTION

According to the present invention, there is provided a hydraulic control system for an automatic transmission, in which a powertrain is effectively and stably controlled by hydraulic pressure. The powertrain includes a first friction element, actuated to discontinue operation of a one-way clutch when an engine brake is needed, and a second friction element, which operates only when the first friction element is not engaged.

In a preferred embodiment of the present invention, the hydraulic control system comprises a manual valve and a switch valve. The manual valve receives hydraulic pressure from an oil pump and includes a forward range port for exhausting hydraulic pressure when driving in a forward range and an L range port for exhausting hydraulic pressure for low speed control. The switch valve is controlled by an engine brake signal pressure, solenoid pressure, and forward range pressure supplied from the forward range port. The switch valve selectively supplies control pressure to the first friction element and the second friction element.

According to a preferred embodiment of the present invention, the engine brake signal pressure is L range pressure supplied from the L range port of the manual valve. Preferably, in the selective supply of control pressure to the first and second friction elements by the switch valve, the control pressure is supplied to the second friction element only when either or both the engine brake signal pressure and the solenoid pressure is not being supplied. The switch valve includes a spool, and the forward range pressure acts on one side of the spool and the engine brake signal pressure and the solenoid pressure act on an opposite side of the spool. The spool generally includes a first land on which the forward range pressure acts, a second land on which the engine brake signal pressure acts, and a third land on which the solenoid pressure acts. Preferably one of either the second land or the third land has a surface area larger than a surface area of the first land and the other of either the second land or the third land has a surface area smaller than the surface area of the first land, and the difference between surface areas of the second land and the third land is smaller than the surface area of the first land.

According to a further embodiment of the present invention, the switch valve body includes an input port for receiving control pressure, a first supply port formed in a direction toward the first land from the input port and connected to the first friction element, and a second supply port formed in a direction toward the second land from the input port and connected to the second friction element. Further, the fourth and fifth lands, which provide selective communication between the input port and the first supply port or the second supply port, are formed on either side of the input port. Preferably, the valve body further includes a first exhaust port for exhausting hydraulic pressure from the first supply port, and a second exhaust port for exhausting pressure from the second supply port.

In an alternative embodiment of the invention, the hydraulic control system includes at least two switch valves for facilitating control of plural friction elements of the transmission. A first switch valve communicates with hydraulic lines of the system to provide selective supply of hydraulic fluid pressure to a first and a fourth clutch from the drive range line pressure. A second switch valve communicates with hydraulic lines of the system to provide selective supply of hydraulic fluid pressure to a first brake and second clutch from the neutral range line pressure. The control system also preferably includes a manual valve responsive to a user manipulated shift lever for selecting between different available shift ranges of the transmission, such as the drive, neutral, reverse and park ranges. Also in a preferred embodiment one solenoid valve may provide one source of control pressure to both the first and second switch valves.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

Preferred embodiments of the present invention will now be described in detail with reference to the accompanying drawings.

Figure 1:
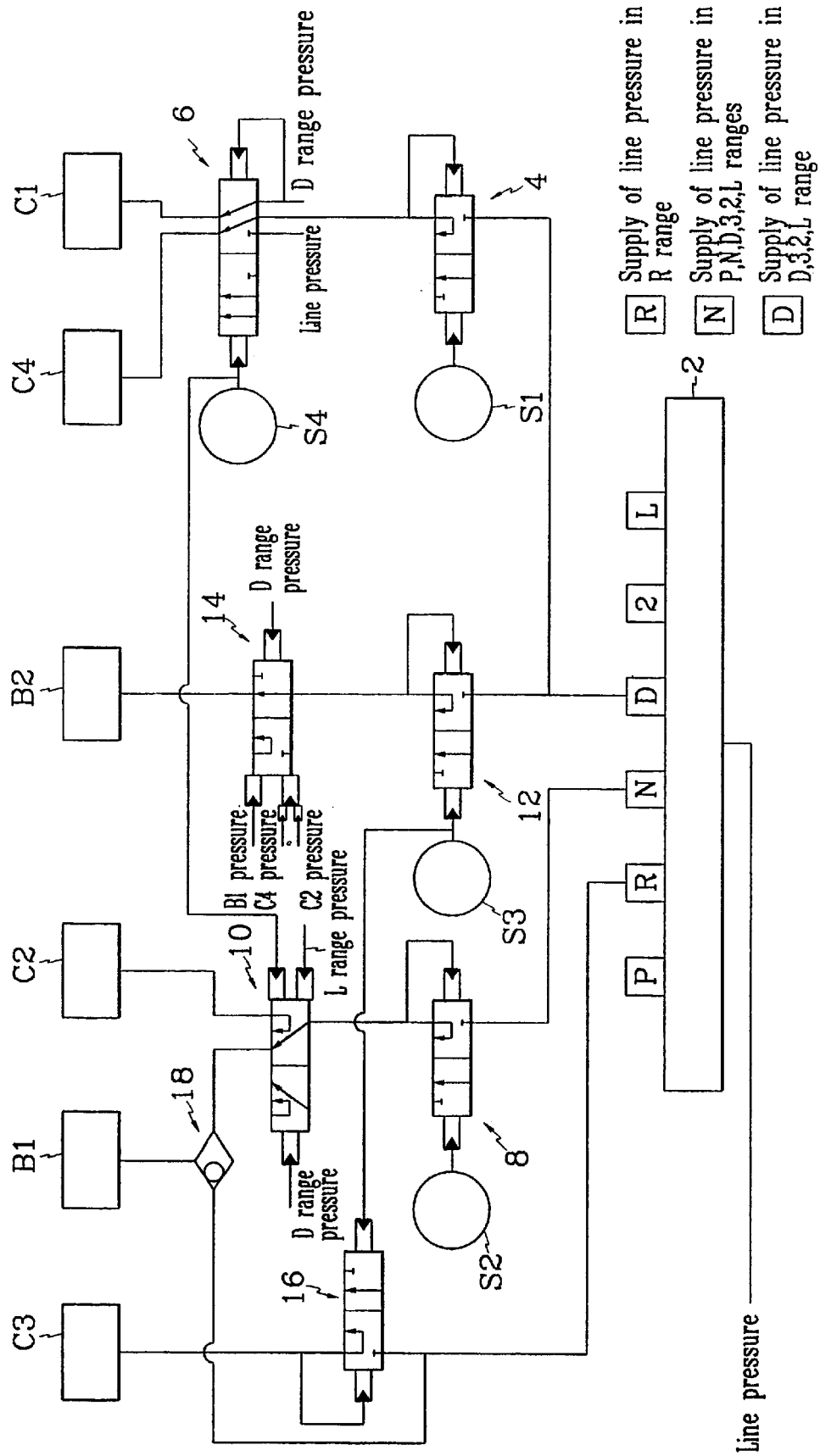
FIG. 1 is a schematic view of a hydraulic control system for an automatic transmission according to a preferred embodiment of the present invention.

In FIG. 1, elements of manual valve 2 according to the invention, which is directly involved in the control of shifting into the different ranges, are shown in block form. Since line pressure control and damper clutch control are performed as in the prior art, a person skilled in the art will, understand those operations, and a detailed description will not be provided.

Friction elements C1, C2, C3, C4, B1, and B2 are engaged for different speeds and ranges as in the conventional hydraulic control system. That is, the first clutch C1 operates in first, second, and third speeds; the second clutch C2 operates in the third speed as well as a fourth speed; the third clutch C3 operates in a reverse R range; the fourth clutch C4 operates in a park P range, the reverse R range, a neutral N range, and a low L range, and as needed in the first, second, and third speeds; the first brake B1 operates in the park P, reverse R, neutral N and low L ranges; and the second brake B2 operates in the second and fourth speeds.

However, in the present invention, structure is realized such that the first clutch C1 and the fourth clutch C4 jointly use the same hydraulic pressure supply, and the second clutch C2 and the first brake B1 jointly use the same hydraulic pressure supply. The third clutch C3 and the second brake B2, on the other hand, are supplied with different control pressures.

In more detail, the first and fourth clutches C1 and C4 jointly use an output pressure of a first pressure control valve 4, which is controlled by a first solenoid valve S1. The output pressure of the first pressure control valve 4 is directed by operation of a first switch valve 6 for the selective supply to the first and fourth clutches C1 and C4. Such joint utilization of pressure is possible since control of the first clutch C1 need only be performed during N to D shifting, while the fourth clutch C4 requires operation only in a second speed and higher.

Also, the second clutch C2 and the first brake B1 jointly use an output pressure of a second pressure control valve 8, controlled by operation of a second solenoid valve S2. That is, the output pressure of the second pressure control valve 8 is directed by a second switch valve 10 to be selectively supplied to the second clutch C2 and the first brake B1. The first and second switch valve 6 and 10 are both controlled by a fourth solenoid valve S4.

Such joint utilization of the output pressure of the second pressure control valve 8 by the second clutch C2 and the first brake B1 is possible since control of the second clutch C2 need only be performed in the third and fourth speeds. To supply hydraulic pressure to the first brake B1 in the park P and neutral N ranges, N range pressure of the manual valve 2 is supplied to the second pressure control valve 8.

The second brake B2 receives an output pressure of a third pressure control valve 12, which is controlled by a third solenoid valve S3. A fail-safe valve 14 is mounted between the second brake B2 and the third pressure control valve 12. Also, the third clutch C3 receives an output pressure of a fourth pressure control valve 16, with the fourth pressure control valve 16 also controlled by the third solenoid valve S3.

In the reverse R range, hydraulic pressure from the fourth pressure control valve 16 is supplied to the first brake B1 via a shuttle valve 18 between the first brake B1 and the second switch valve 10.

Among the various valves comprising the hydraulic circuit as described above, the second switch valve 10 will be described in more detail. Second switch valve 10 is controlled by D range pressure and by control pressure of the fourth solenoid valve S4, as well as L range pressure supplied to an opposite side of the second switch valve 10. Lines are connected to the second switch valve 10 to enable the supply of hydraulic pressure from the second pressure control valve 8 to the second clutch C2 and the exhaust of hydraulic pressure supplied to the first brake B1, or to enable the supply of hydraulic pressure from the second pressure control valve 8 to the first brake B1 and to exhaust hydraulic pressure supplied to the second clutch C2.

Since the second switch valve 10, during typical forward driving of the vehicle, may operate the second clutch only, and since the first brake operates in the reverse R range or first speed of the low L range, L range pressure is used as control pressure. However, if at the instant when the manual valve 2 is moved to the low L range the supply of hydraulic pressure to the second clutch C2 is discontinued while the supply to the first brake B1 is started, shift shock or the momentary inability to transmit power may result.

That is, shift shock results from the sudden supply of hydraulic pressure to the first brake B1. In the case where shifting into the low L range is performed when driving at high speeds (e.g., in third or fourth speeds of the drive D range), the sudden disengagement of the second clutch C2 and engagement of the first brake B1 results in the equally sudden increase in engine rpm. If engine rpm increases to a level at or higher than fuel cut-off rpm, normal operation of the vehicle is not possible.

To solve this problem, therefore, both L range pressure and pressure of the fourth solenoid valve S4 operate as control pressure on an opposite side of the second switch valve 108 from which the D range pressure operates. That is, the conversion of port communication can be accomplished by the operation of both the L range pressure and the pressure of the fourth solenoid valve S4.

Figure 2:
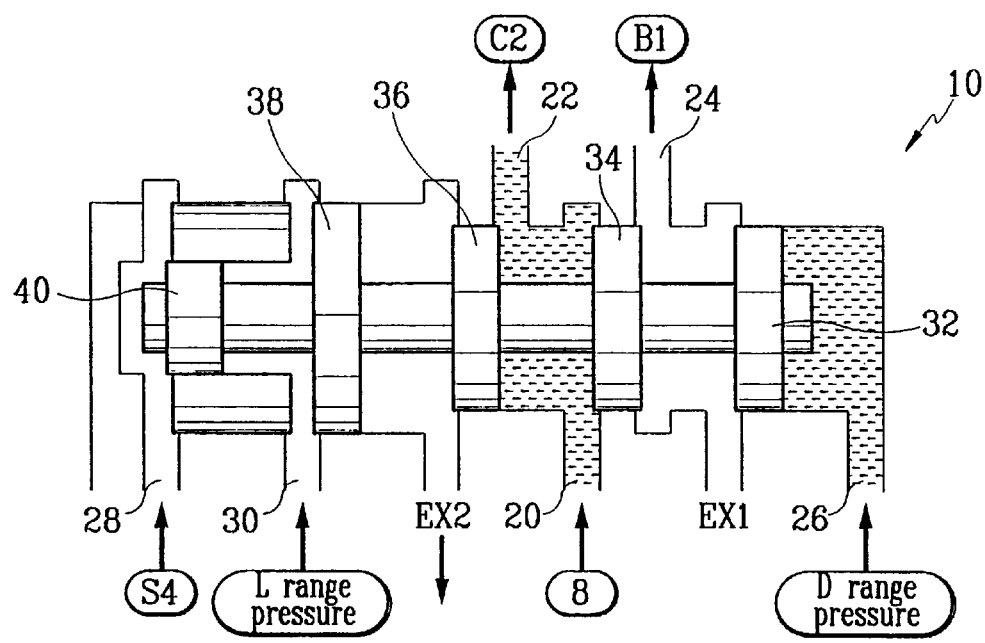
FIG. 2 is a sectional view of a switch valve of FIG. 1 in D, 3, 2, and L states.
Figure 3:
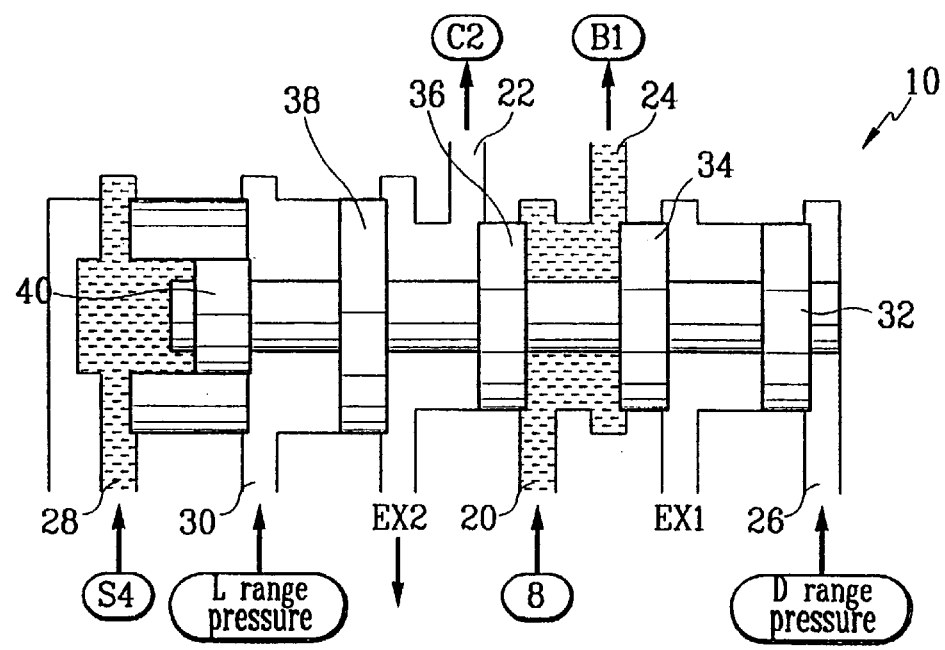
FIG. 3 is a sectional view of a switch valve of FIG. 1 in P, R, and N states.
Figure 4:
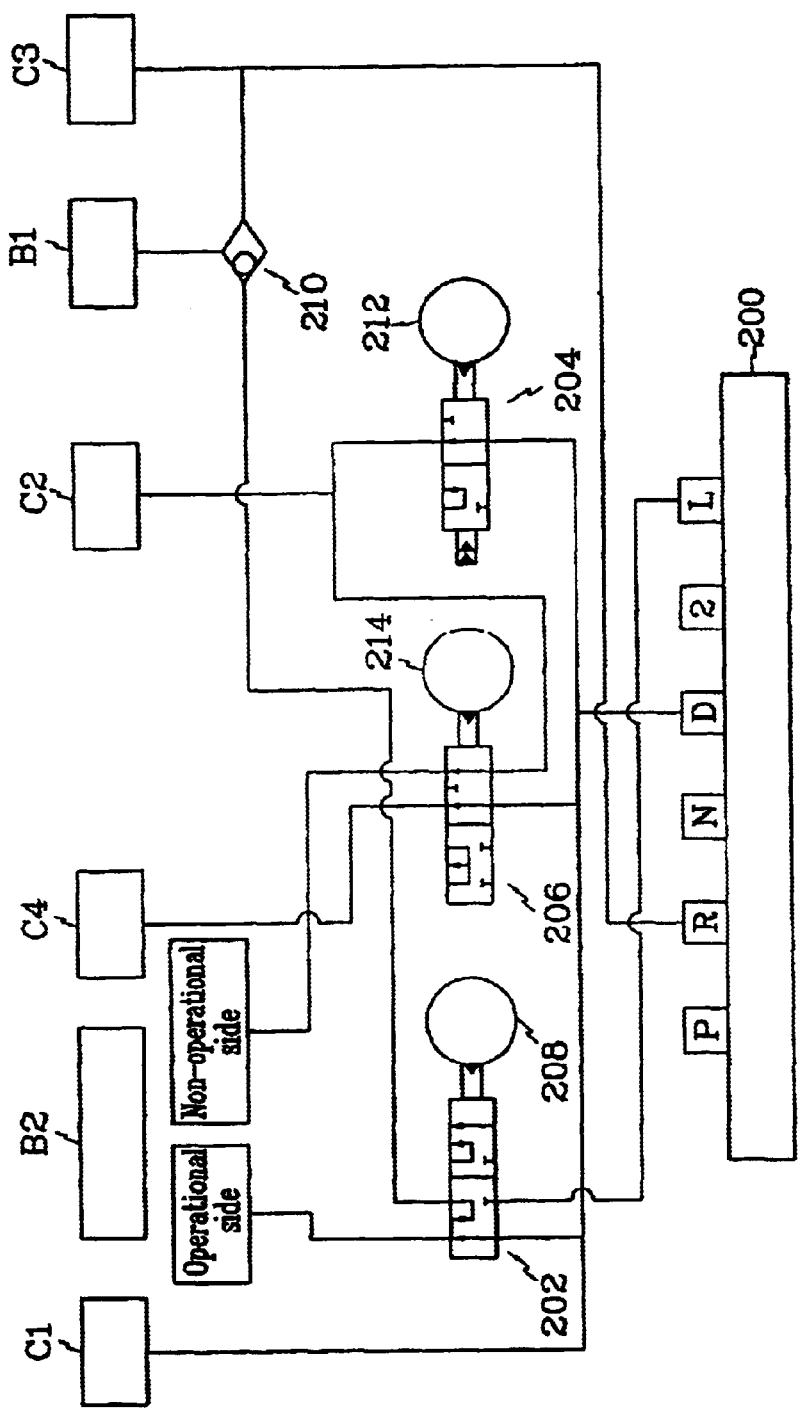
FIG. 4 is a schematic view of a conventional hydraulic control system for an automatic transmission.

In more detail, with reference to FIG. 2 and FIG. 3, the second switch valve 10 includes multiple ports and a valve spool with lands as follows. A first port 20 receives the output pressure from the second pressure control valve 8. Second and third ports 24 and 22 supply hydraulic pressure from first port 20, respectively, to the first brake B1 and the second clutch C2. A fourth port 26 receives D range pressure as control pressure. A fifth port 28, formed in a side of the second switch valve 10 opposite the fourth port 26, receives control pressure from the fourth solenoid valve S4. A sixth port 30, formed adjacent to the fifth port 28, receives line pressure as control pressure. Exhaust ports EX1 and EX2 exhaust the hydraulic pressure supplied to the second and third ports 24 and 22, respectively.

The lands of the valve spool mounted within a valve body of the second switch valve 10 are as follows: A first land 32 is acted upon by the control pressure supplied through the fourth port 26. A second land 34 operates together with the first land 32 to selectively communicate the second port 24 with the first port 20 and the first exhaust port EX1. A third land 36 operates together with the second land 34 to selectively communicate the first port 20 with the third port 22 and the second port 24. A fourth land 38 is acted upon by the control pressure supplied through the sixth port 30 that operates together with the third land 36 to selectively communicate the third port 22 with the second exhaust port EX2. A fifth land 40 is acted upon by the control pressure supplied through the fifth port 28.

One of either the fourth land 38 or the fifth land 40 has a surface area greater than that of the first land 32 (i.e., the fourth land 38), and one of either the fourth land 38 or the fifth land 40 has a surface area less than that of the first land 32 (i.e., the fifth land 40). Further, a difference in surface areas between the fourth and fifth lands 38 and 40 is less than the surface area of the first land 32.

Accordingly, if hydraulic pressure is supplied either to the fifth port 28 or the sixth port 30 in the case where D range pressure is not supplied to the fourth port 26, the valve spool is displaced to the right (in the drawing) such that the hydraulic pressure supplied through the first port 20 is provided to the first brake B1 via the second port 24. That is, in ranges and speeds other than a forward driving range or speed, the fourth solenoid valve S4 is operated to control the control pressure supplied through the fifth port 28 such that one-way control of the first brake B1 is possible when in the reverse R range. On the other hand, in the case where D range pressure is supplied to the fourth port 26, hydraulic pressure must be supplied to both the fifth and sixth ports 28 and 30 to move the valve spool to the right for the supply of hydraulic pressure to the first brake B1.

As a result, if the driver, while driving at a high speed (such as when in the third or fourth speeds), operates the shift lever into the low L range, so that the manual valve 2 is also positioned in the low L range, although L range pressure is supplied to the second switch valve 10 through the sixth port 30, the pressure of the fourth solenoid valve S4 is controlled, thereby enabling suitable control of the timing and force of the hydraulic pressure supplied to the first brake B1.

In the hydraulic control system for automatic transmissions according to a preferred embodiment of the present invention described above, a switch valve, which enables the supply of a single supply pressure by line conversion to the second clutch in the third and fourth speeds and to the first brake in the park P, reverse R, neutral N, and low L ranges, is controlled by solenoid control pressure and L range pressure, and by D range pressure supplied to an opposite side of the switch valve. As a result, damage to the powertrain caused by the simultaneous operation of the second clutch and the first brake is effectively prevented. That is, the present invention provides a hydraulic control system that effectively and stably controls the first brake, which operates as an engine brake, and the second clutch, which operates only when the first brake is disengaged.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission that controls a powertrain, which includes a first friction element for use as an engine brake for discontinuing operation of a one-way clutch in the transmission and a second friction element operating only when the first friction element is disengaged, the hydraulic control system comprising:

a manual valve including a forward range port for exhausting hydraulic pressure when driving in a forward range, and an L range port for exhausting hydraulic pressure for low speed control; and a switch valve controlled by engine brake signal pressure, solenoid pressure, and forward range pressure supplied from the forward range port, the switch valve selectively supplying control pressure to the first friction element and the second friction element.

2. The hydraulic control system of claim 1 wherein the engine brake signal pressure is L range pressure supplied from the L range port of the manual valve.

3. The hydraulic control system of claim 1 wherein in the selective supply of control pressure to the first and second friction elements by the switch valve, the control pressure is supplied to the second friction element only when the forward range pressure is supplied, and either or both the engine brake signal pressure and the solenoid pressure is not being supplied.

4. The hydraulic control system of claim 1 wherein the switch valve includes a spool, and the forward range pressure acts on one side of the spool and the engine brake signal pressure and the solenoid pressure act on an opposite side of the spool, wherein the spool includes a first land on which the forward range pressure acts, a second land on which the engine brake signal pressure acts, and a third land on which the solenoid pressure acts, and wherein one of either the second land or the third land has a surface area larger than a surface area of the first land, and the other of either the second land or the third land has a surface area smaller than the surface area of the first land, and a difference between surface areas of the second land and the third land is smaller than the surface area of the first land.

5. The hydraulic control system of claim 4 wherein a valve body of the switch valve includes an input port for receiving control pressure, a first supply port formed in a direction toward the first land from the input port and connected to the first friction element, and a second supply port formed in a direction toward the second land from the input port and connected to the second friction element, and wherein fourth and fifth lands, which selectively communicate the input port with the first supply port and the second supply port, are formed on either side of the input port.

6. The hydraulic control system of claim 5 wherein the valve body of the switch valve further includes a first exhaust port for exhausting hydraulic pressure from the first supply port, and a second exhaust port for exhausting pressure from the second supply port.

7. A hydraulic control system for an automatic transmission that controls a powertrain, which includes a brake for discontinuing operation of a one-way clutch operating in a low L range and a reverse R range and includes a clutch for transmitting power in third and fourth speeds, the hydraulic control system comprising:

a manual valve including a forward range port for exhausting hydraulic pressure when driving in a forward range, and an L range port for exhausting hydraulic pressure for low speed control; and a switch valve controlled by L range pressure of the manual valve, forward range pressure, and solenoid pressure, the switch valve being controlled by a solenoid valve to selectively supply pressure to the clutch and the brake, wherein the switch valve, in the case where the forward range pressure is supplied, supplies pressure controlled by the solenoid valve to the clutch in the case where L range pressure is not input and supplies the pressure controlled by the solenoid valve to the brake by control of the solenoid pressure in the case where the L range pressure is input, and wherein the switch valve supplies pressure controlled by the solenoid valve to the brake when the forward range pressure is not input.

8. The hydraulic control system of claim 7 wherein the forward range pressure is supplied as control pressure to a side of the switch valve opposite that to which the L range pressure and the solenoid pressure are supplied.

* * * * *